June 8, 1948.　　　　　F. FRIEDRICH　　　　　2,442,871
MOTOR AND RECEPTACLE THEREFOR
Filed Sept. 16, 1946

INVENTOR
FRANK FRIEDRICH.

By Albert Rosenberg Jr.
ATTORNEY

Patented June 8, 1948

2,442,871

UNITED STATES PATENT OFFICE 2,442,871

MOTOR AND RECEPTACLE THEREFOR

Frank Friedrich, West Forest Hills, Long Island, N. Y., assignor to The National Steam Conservation Company Application September 16, 1946, Serial No. 697,366

4 Claims. (Cl. 236—72)

1

My invention relates to motors and to improvements in their construction and operation, together with novel means and methods for controlling the movements of the motor.

The objects of my invention and improvements are: first, to provide a novel motor; second, to provide a motor with a receptacle which carries within it all of the elements which regulate the movements of the motor; third, to provide a motor with a receptacle carrying within it the means for starting and stopping the motor automatically; fourth, to provide a motor with a receptacle carrying within it the means for operating it and for thermostatically controlling its operation and regulation; fifth, to provide a motor with a receptacle having an inlet and an outlet, the outlet being controlled and regulated automatically by thermostatic means carried within said receptacle; sixth, to provide a motor with a receptacle carrying within it a Bourdon tube for regulating its movements controlled by thermostatic means influenced by temperature variations of the atmosphere; seventh, to provide a motor with a receptacle provided with an inlet and an outlet, a Bourdon tube thermostat carried within the receptacle for varying the outlet; eighth, to provide a motor with a receptacle having an inlet and an outlet for controlling the movements of the motor, and means carried within the receptacle for supplementing the outflow from the outlet whereby to stop and start the motor; ninth, to provide a motor with a receptacle having an inlet and an outlet and means carried within the receptacle for operating the outlet by an electric circuit; tenth, to provide a motor with a receptacle having an inlet and an outlet, and a supplemental outlet operable by means for timing the opening and closing the supplemental outlet; eleventh, to provide a motor with a receptacle having an inlet and an outlet provided with an overflow within said receptacle to prevent flooding in the event of the mouth of the outlet in a tank carried by the said receptacle, becoming clogged or from otherwise causing flooding of the receptacle; twelfth, in a receptacle carrying a tank for holding and emptying a fluid, a means for detachably securing said tank comprising a shelf provided with a slot cut out of it from its center to its outer edge, to permit its removal and installation without disassembling it.

2

Figure 1:
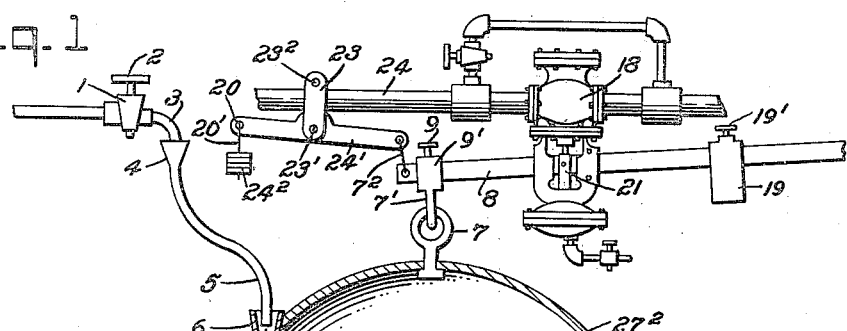
Figure 1 is a cross-sectional view of the motor showing its relation to control means.
Figure 2:
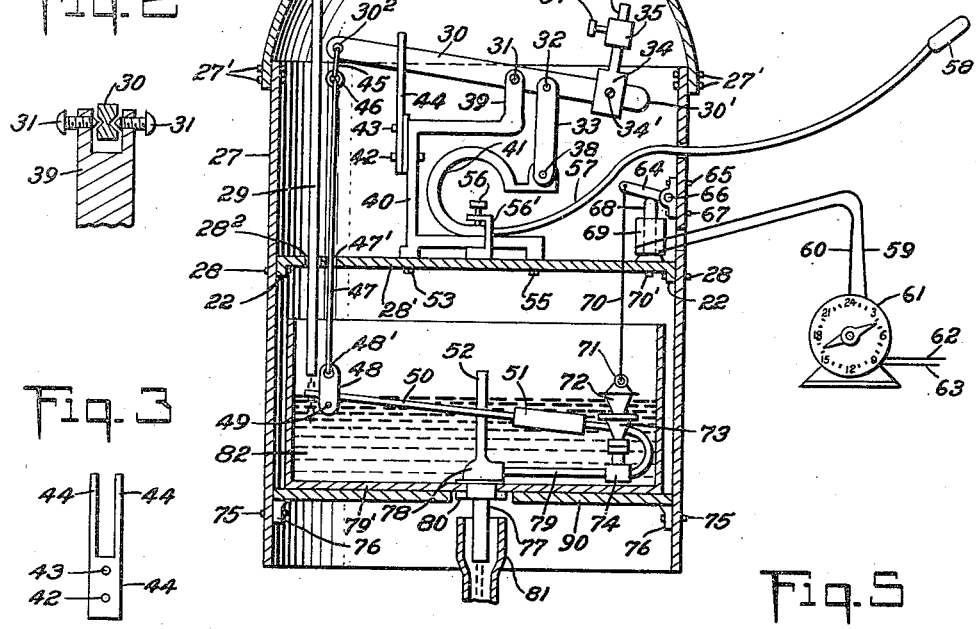
Figure 2 is a cross-sectional view of the support for lever 30 of Figure 1.
Figure 3:
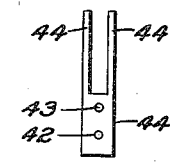

Figure 3 is a view showing a guide fork for lever 30 of Figure 1.

Figure 4:
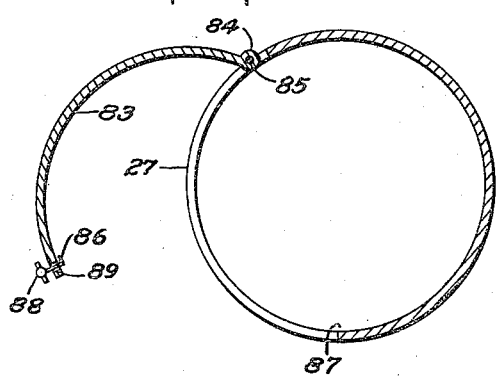

Figure 4 is a cross-sectional view of receptacle 27 of Figure 1.

Figure 5:
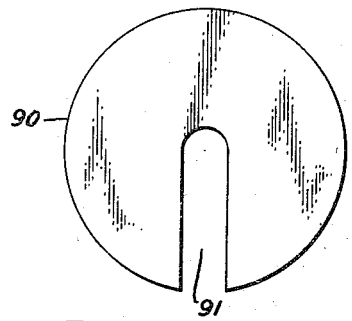

Figure 5 is a view of a shelf for supporting the tank of Figure 1.

Referring to the drawings, similar numerals refer to similar parts throughout the several figures in which 1 is a cock with its key 2 and neck 3 secured to the coupling 4 of the flexible tube 5 which at its other end is secured to the inlet 6 of the receptacle 27 and supplies a trickle of fluid to the tube 29 which passes through the orifice $28^2$ is the shelf $28^1$ secured to receptacle 27 by the brackets 22 and the bolts 28, this receptacle 27 also carries the shelf 90 resting upon the brackets 76 secured by the bolts 75 to the receptacle 27 and upon this shelf 90 rests the detachable tank $79^1$ to which is secured the outlet pipe nipple 77 and the outlet 78 which empties into the drain 81, to which outlet is also secured the supplemental outlet 52 and the outlet pipe 79 secured to the L 78 to which is also secured the T 74 attached to the valve 73 into which the stopping and starting plug stopper 72 fits, to which plug stopper 72 is secured one end 71 of the connecting wire 70; the valve 73 is secured to the U bend of the outlet pipe 79 which is also fixed in the flexible sleeve 51 which is slipped onto the end of the outlet pipe 50 to which is secured the clamp strap 48 by its bolt 49 which clamp strap 48 is also secured at its eye 48' to the connecting rod 47 which passes through an orifice $47^1$ in shelf $28^1$ to connect with the eye 46 in the link 45 secured in the eye $30^2$ of the lever 30 which is guided in its movements by the straddle fork 44 secured to the frame 40 by the screws 42 and 43 which frame supports the Bourdon tube 41 held to said frame by the clamp $56^1$ and its set-screw 56. This frame 40 is secured to the shelf $26^1$ by the screws 53 and 55; to the Bourdon tube at one end is sealed one end of the capillary tube 57 which at its other end is sealed to the capsule 58 of the thermostat combination; at the other end of the Bourdon tube 41 is pivotally mounted by the pivot 38 to the link 33 which at its other end is pivoted by the pivot 32 to the short arm $30^1$ of lever 30 which is fulcrumed in the extension 39 of the frame 40 by the pin 31; onto this lever 30 at its short arm $30^1$ is slidably fastened the counterbalance weight 34 by its set-screw $34^1$ and which carries a stem 36 onto which is slidably fixed an additional counterbalancing weight 35 secured when properly adjusted by its set-screw 37. Onto the receptacle 27 is secured the dome or hood 27² by the screws 27¹. Onto the steam pipe 24 is secured the balanced reducing valve 18 the stem of which is pivoted by the pin 21 to the lever 8 to which is secured the sleeve 9¹ by its set-screw 9 and which carries a hook 7¹ hooked in the eye 7 of the bolt secured to the hood or dome 27² of the receptacle 27; at the other end of the lever 8 is slidably fixed the sleeve-weight or counterbalance 19 by its set-screw 19¹; onto the steam pipe 24 which acts as a support for my motor, is secured a strap-clamp 23 fastened by its bolt 23² at its upper end and at its opposite end is fulcrumed by the pivot 23¹ to the lever 24¹ secured at one end to the link 7² which is linked to the end eye of lever 8, and said lever 24¹ at its opposite end carries the detachable weight 24² by the rod 20¹ secured into the eye 20 of lever 24¹ which acts as an auxiliary counterbalance to my motor. The stopper 72 is secured to the connecting rod 78 which at its opposite end is coupled to lever 64 pivoted by the pin 66 in the side hanger 67 to hold it to the side wall of the receptacle 27 by screw-bolts 65. The lever 64 rests upon the core 68 of the solenoid 69 secured to the shelf 28¹ by the screw 70¹; the leads from the solenoid 59 and 60 are connected to the make and break contact points in the time clock 61 in the usual manner well known in the state of the art, not thought necessary to illustrate here; and to the time clock 61 is secured the terminals of an electric circuit 62 and 63 which lead to a suitable switch of an electric circuit not thought required to be illustrated here. The shelf 90 rests upon the brackets 76 secured by bolts 75 to opposite interior sides of receptacle 27, and is provided with an elongated slot 91 whereby the tank 79¹ holding the fluid 82 can be removed and replaced by opening the door 83 secured by its hinge 84 and its pin 85 to the casing of the receptacle 27, and when the said door is closed, it is fastened by the turnbuckle 86 passing through the orifice 89, by turning the handle 88. This turnbuckle 86 fastens the door 83 to the receptacle 27 at the place marked 87.

The operation of my Aqua-Poise motor is illustrated with all operating parts contained within a suitable receptacle 27 which automatically lowers itself when the stopper 72 falls into valve 73 when the electric circuit is broken by the electric clock 61 causing the magnetic flux in the solenoid 69 to permit its core 68 to fall and permit the falling of the lever 64 and its connecting rod or wire 70 to permit the said stopper to fall automatically into its valve 73 and thus hold the fluid 82 trickling through pipe 29 in the tank 79¹, thereby increasing the weight of my motor receptacle 27 to automatically pull down the lever 8 permitting greater pressure of steam to flow through the balanced valve 18 causing more heat radiation in a reticulated pipe heating system in any building structure where it is installed; and when the stopper 72 is lifted off of its seat of the valve 73, the fluid 82 will flow out through said valve to the drain 81, thereby causing the motor receptacle 27 to lose weight thereby permitting the counterbalancing weights 19 and 24² to act upon lever 8 thereby causing the receptacle 27 to rise and thereby permit the balanced valve 18 to partially shut off the pressure of steam flowing through it and through the steam pipes to the radiator devices in a building structure to which they are connected. This timing of the opening and closing of the said valve 73, is for discontinuing the operation of my motor during the periods when the building structure is out of use, and starting its operation by temperature regulation when said structure is in use.

The temperature regulation when the motor is in operation, is effected by altering the pressure of the steam by closing partially, the valve in the balanced valve 18 when the temperature rises in outside atmosphere; and when the outside temperature falls, the said valve in the balanced valve is opened to accordingly provide more pressure flow to said heating radiators. It is evident that I regulate the pressure flow of steam for a temperature regulating heating system, and this regulating system is entirely automatic in its operation.

While I do not care to limit myself to varying the pressure flow of steam, it is believed that this regulation of the pressure will be the most economical method for conserving the volume of steam, the heat from which is absorbed by the heat radiation of a heating system.

It will be seen that the fluid in the tank 79¹ will rise and fall to various levels according to temperature regulation of the Bourdon tube 41, and that this varying weight of the fluid 82 in the tank will operate the motor automatically, and that it will flow out of the outlet 77 which is loosely fitted into the drain 81 so as not to interfere with the vertical movements of my motor receptacle 27.

My system of regulating the pressure flow of steam according to the outside temperature, prevents shocking the joints of the pipes of the heating system, which might be the effect if the steam flow is entirely shut off and then turned on when the pipes are cooled; this proportionally closing and opening of a balanced valve for controlling the pressure of steam flowing into pipes connecting to a heating system for heating buildings, is found to be the most economical method and very effective for temperature regulation without shocking the joints of the pipes.

While I have illustrated the outlet stopper 72 lifted off its valve seat, it should have been shown closed in this instance since the water or fluid 82 is shown at its high level reached when its weight pulls down the lever 8 to open the balanced valve 18 to cause the steam pressure to be increased in the pipes connected to the heating system. The stopper 72 is normally closed when the motor is in operation. I do not care to limit myself to any particular shape or construction of the receptacle 27, nor to any particular method for discontinuing the operation of my motor and automatically starting it again when the building is in use again.

Having described my invention and improvements, what I claim is:

1. A variable weight motor comprising a lever and fulcrum therefor, a support for said fulcrum, a receptacle secured to one arm of said lever and provided with an inlet and an outlet, a counterbalance secured to the other arm of said lever, a duct secured at one end to the outlet of said receptacle, means for moving the free end of said duct within said receptacle and comprising the active part of a thermostat lying within said receptacle, a standard within said receptacle for supporting said active part of said thermostat, a support for said standard within said receptacle, a fulcrum secured to said standard, a secondary lever within said receptacle rockable upon said fulcrum, a link secured to said secondary lever, and said link also secured at its other end to the active part of said thermostat, a connecting-rod secured to the other arm of said secondary lever, the other end of said connecting-rod being secured to the free end of said duct and lying within said receptacle, a supplementary outlet secured to the first named outlet between said outlet and the free end of said duct, a valve body secured to said supplementary outlet and a stopper therefor, means for operating said stopper, and an overflow outlet secured within said receptacle to said first mentioned outlet.

2. A variable weight motor described in claim 1, the means for operating said stopper comprising a lever and pivoted support therefor suitably secured to the interior of said receptacle, a connecting rod suitably secured at one end to the free end of said lever, the other end of said connecting rod secured to said stopper, a solenoid provided with an active core upon which said lever rests, said solenoid suitably secured to the interior of said receptacle, and means for automatically activating said solenoid.

3. A variable weight motor described in claim 2, wherein the receptacle comprises a tank with which is assembled the supplementary outlet and a stopper therefor, the means for actuating the solenoid being an automatic timing means for opening and closing said stopper means.

4. A variable weight motor described in claim 1 in which the receptacle provided with a laterally opening section secured at one side to said receptacle with means for closing and fastening said section to the said receptacle, whereby inspection can be made of the operating parts inside of said receptacle while in motion, and for assembling and disassembling the interior parts when required, a detachable tank provided with an outlet, a support for said tank secured to and near the bottom of said receptacle, said support provided with a radial slot whereby said tank and its outlet can be laterally inserted or removed from said receptacle.

FRANK FRIEDRICH.

REFERENCES CITED

The following references are of record in the file of this patent:

UNITED STATES PATENTS

| Number | Name | Date |
|--------|------|------|
| 333,790 | Tatham | Jan. 5, 1886 |
| 333,791 | Tatham | Jan. 5, 1886 |
| 561,718 | Martindale | June 9, 1896 |
| 1,630,586 | Smith | May 31, 1927 |
| 1,951,697 | Klein | Mar. 20, 1934 |